United States Patent [19]

White

[11] Patent Number: 4,458,102
[45] Date of Patent: Jul. 3, 1984

[54] TRANSMISSION LINE COMPOSITE BEAM SUSPENSION ASSEMBLY

[76] Inventor: Herbert B. White, P.O. Box 939, Hudson, Quebec, Canada, J0P 1H0

[21] Appl. No.: 421,837

[22] Filed: Sep. 23, 1982

[30] Foreign Application Priority Data

Mar. 17, 1982 [CA] Canada .................................. 398620

[51] Int. Cl.³ .............................................. H02G 7/20
[52] U.S. Cl. ......................................... 174/43; 52/40; 174/45 R; 174/149 R
[58] Field of Search ..................... 174/40 R, 43, 45 R, 174/148, 149 R, 150; 52/40, 697; 191/40, 41; 248/58

[56] References Cited

U.S. PATENT DOCUMENTS 1,664,922  4/1928  Goodrich .......................... 52/40 X

FOREIGN PATENT DOCUMENTS 53755  2/1967  German Democratic Rep. ... 174/43
551441  5/1977  U.S.S.R. .................................. 52/40

OTHER PUBLICATIONS

"Building for Tomorrow–An Evaluation of Transmission Structures and Insulators", published by Ohio Brass Co., Mansfield, Ohio, 23 pages total, publication date unknown but submitted by applicant as prior art.
Zobel, E. S., et al., Cigre Report, "Narrower Transmission Corridors Made Possible with New Compacted Conductor Support Systems for EHV and UHV Lines", International Conference on Large High Voltage Electric Systems, Aug. 27–Sep. 4, 1980 Session, 22-06, pp. 1–15.

Primary Examiner—Laramie E. Askin
Attorney, Agent, or Firm—Stevens, Davis, Miller & Mosher

[57] ABSTRACT

A suspension system supports a plurality of high voltage electrical conductors forming part of a transmission line in a predetermined spaced pattern relative to one another. The system includes a rigid compression strut arranged to extend generally horizontally between a pair of spaced primary support points. A flexible tension member is suspended below the compression strut and has its opposing ends connected at said primary support points. When the tension member is loaded, it applies compression forces lengthwise of the strut. An array of insulators is disposed below the flexible tension member for supporting the plurality of electrical conductors in the preselected pattern relative to one another. At least certain of these insulators are connected to the tension member so that the latter bears a portion of the total loading imposed by the conductors.

8 Claims, 6 Drawing Figures

TRANSMISSION LINE COMPOSITE BEAM SUSPENSION ASSEMBLY

BACKGROUND OF THE INVENTION

This invention relates to improvements in suspension systems for supporting a plurality of high voltage electrical conductors forming part of a transmission line in a predetermined spaced pattern relative to one another.

The traditional form of high or extra high voltage transmission line support structure included a rigid framework of latticed steel having rigid crossarms which supported the phases of conductors at the ends of the necessary insulator assemblies.

Approximately twenty years ago, a sometimes more useful or efficient structure consisting of a rigid crossarm supported on two guyed masts in V or Portal form, became popular. For lower voltage applications, these towers are small enough to be totally assembled on a flat area near the site and raised or rotated into position with a small crane or gin pole assembly. However, for higher voltage applications, the crossarms must be made relatively large with the result that they are heavy and unwieldy and pose very serious construction problems.

An alternative solution has been to replace the conductor-supporting crossarm structure or bridge with a steel cable system suspended between a pair of masts. There has been a continuing and present trend to the use of these "crossarmless" towers, the first to be used in a major operating line being the cross rope suspension structure (the Chainette) on Hydro-Quebéc's Third James Bay to Montreal 735 KV Line. Potential advantages of the cross armless towers include lower construction and material supply costs as well as other effects which result from the ability to bring the conductor phases closer together. In this regard it might be noted that there are no grounded steel components between the phases from which one must maintain very large clearances. This reduced phase spacing reduces the necessary width of the right-of-way and also lowers the electrical reactance, thus permitting greater power transfer capacity under stable conditions.

There has been a substantial degree of acceptance by those skilled in this art of the principle of suspending the conductor phases from a flexible support assembly which in itself is supported between two relatively fixed points. These points will normally, but not necessarily, be the upper ends of two guyed masts but could also be the tops of two arms of a rigid tower structure.

The next development in this area was to rearrange the conductors from a flat configuration (as seen looking along the conductors) into an inverted Delta or triangular array. The advantages of this configuration include a still further reduced right-of-way requirement, coupled with the electrical advantages of even less reactance and a significant reduction in electric field effects at the ground or pedestrian level as one moves away from the center of the line. The primary flexible suspension assemblies which have been devised to date are the suspended inverted Delta or Cluster (Italian notation) or the Suspended T, which has been tested to a limited extent in Germany. These suspension assemblies must be strong enough to resist the loads developed in the conductor systems, which may be any of or combinations of:

(a) Vertical loads of the weight of the conductor plus any designated ice or snow cover or special vertical loads produced by construction or maintenance practices.

(b) Transverse loads produced by wind blowing on the conductors, either bare or ice covered.

(c) Longitudinal loadings that result from either unbalanced ice or wind loads on adjacent spans, or failure containment conditions whereby the tower must resist the longitudinal forces produced by conductor breakage or failure of an adjacent tower.

The above-noted loads and particularly the vertical loads resulting from ice on the conductor produce a very large strength demand on the end insulators of the insulator array, i.e. those insulators which, in the Delta arrangement for example, extend from opposing corners of the Delta upwardly and outwardly to the relatively fixed points noted above which are usually at the tops of the two guyed masts. High strength insulator assemblies are very expensive and they can cost more in certain instances than the supporting mast systems. Furthermore, the large loadings in the end insulators, particularly those produced by vertical loadings, are applied to the suspension points and can be the controlling loads for the mast/guy system. Further disadvantages of the above system are that the integrity of the entire structure depends on the integrity of the end insulators referred to above, i.e. failure of one of them would involve collapse of the entire structure, and that the structure becomes unstable in the event of a broken guy wire.

Of the several problems noted above, the primary problem to be faced is the fact that in these structural arrangements, the insulators and associated hardware of the suspension assembly can represent a large part of the material cost of the total structure, including masts and guy wires. High strength insulators are very expensive in the numbers required for these suspension systems.

SUMMARY OF THE INVENTION

It is accordingly a basic object of the present invention to provide an improved suspension system capable of alleviating many of the disadvantages noted above and which, among other things, is capable of reducing the maximum loading applied to the insulators, thus enabling lower strength and much lower cost insulators to be used. A further objective is to provide a system wherein the structural integrity of the overall suspension assembly does not depend on a single insulator assembly.

Accordingly, the present invention provides a suspension system for supporting a plurality of high voltage electrical conductors forming part of a transmission line in a predetermined spaced pattern relative to one another. The system includes a rigid compression strut arranged to extend generally horizontally between a pair of spaced primary support points. A flexible tension member is suspended below the compression strut and has its opposing ends connected at said primary support points. When the tension member is loaded, it applies compression forces lengthwise of the strut. An array of insulators is disposed below the flexible tension member for supporting the plurality of electrical conductors in the preselected pattern relative to one another. At least certain of these insulators are connected to the tension member so that the latter bears a portion of the total loading imposed by the conductors.

In a preferred form of the invention the insulator array includes opposing end insulator means connected at the primary support points and intermediate insulator means connected to the flexible tension member in such a manner that the total loading imposed on the insulator array by the conductors is shared between the opposing end insulator means and the intermediate insulator means. The flexible tension member thus bears a substantial portion of the total loading.

The flexible tension member typically comprises a high strength steel guy or bridge strand.

A further feature of the invention is that the cable is connected only at the primary support points so that the strut, in use, is subjected substantially only to compressive forces regardless of whether the loadings are the usual vertical loadings imposed by the weight of the conductors or whether the loading is in the longitudinal direction as in the case where there is a failure in the mast-guy support system or in the conductors somewhere down the transmission line. Since the only bending moments arising in the strut would be those relatively small bending moments resulting from its own weight, the compression strut may be relatively lightweight and relatively inexpensive. Furthermore, the suspension system, in effect, keeps the heavy conductor loads from adding to the loadings in the guy system. The advantages associated with this will be self-evident.

It will thus be seen that the suspension system of the present invention involves the use of what may be termed a "composite beam" consisting of the above-referred to relatively simple compression strut for the upper chord of the beam with a high strength flexible tension member or cable acting as the lower tension chord.

The insulator array referred to above may assume a number of different forms so long as the total loading imposed thereon by the conductors is shared in the manner described above. The preferred insulator array includes means for supporting the electrical conductors at first, second and third points in an inverted Delta or triangle array.

A power transmission line will of course include a plurality of suspension systems as recited above supporting the conductors at spaced intervals along the line. Suitable means are connected to each of the compression struts at each of the primary support points for supporting the struts in their generally horizontally disposed positions above the ground. The strut supporting means preferably, but not necessarily, takes the form of a pair of generally upright masts, each mast having its upper end connected to the strut at an associated one of the primary support points with guy wires being connected between the primary support points and suitable anchorages.

An embodiment of the invention will now be described by way of example, reference being had to the appended drawings forming part of this specification.

BRIEF DESCRIPTION OF THE VIEWS OF DRAWINGS

DETAILED DESCRIPTION OF THE PREFERRED EMBODIMENT

Figure 1:
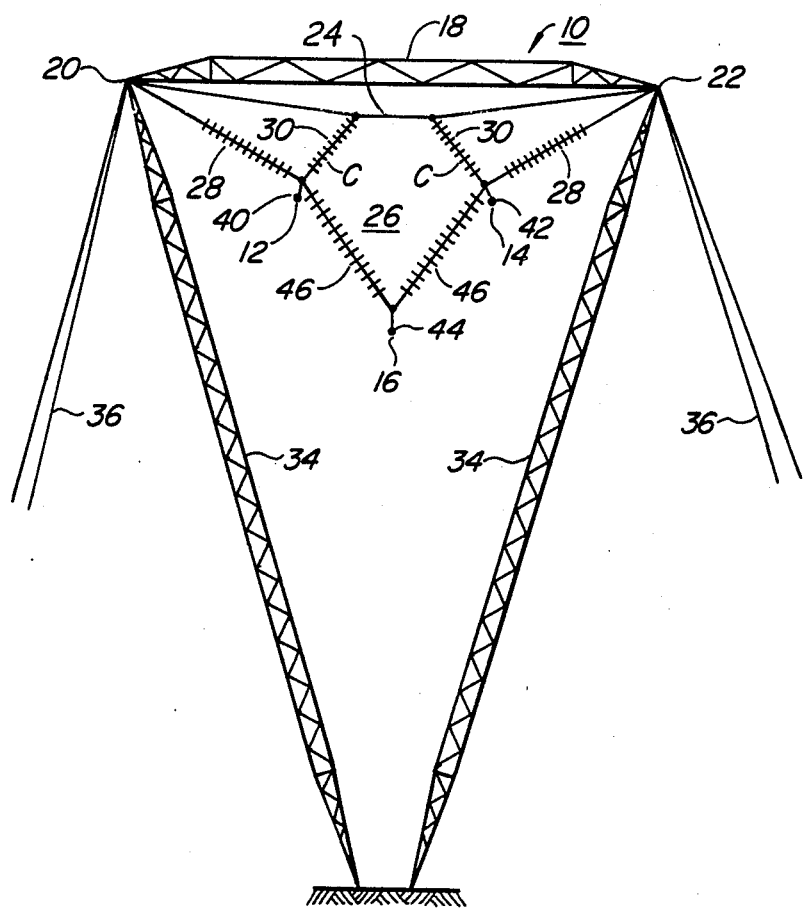
FIG. 1 is a front elevation view of a suspension system in accordance with the invention supported on a pair of guyed masts.

Referring to FIG. 1 there is shown a portion of a power transmission line incorporating the suspension system of the present invention. As shown, the suspension system 10 supports three high voltage electrical conductors 12, 14 and 16 in a spaced apart inverted Delta arrangement.

Figure 4:
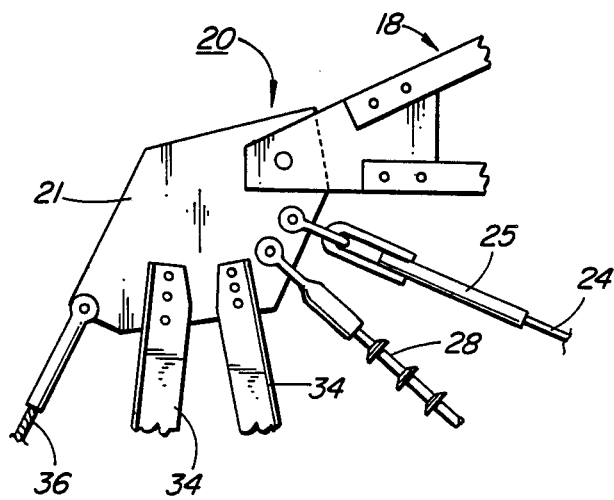
FIG. 4 is a detail view of the construction at one of the primary support points.
Figure 5:
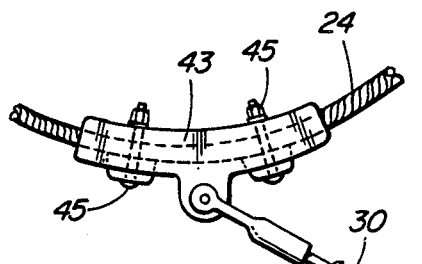
FIG. 5 shows a hanger attached to the flexible tension member for supporting a portion of the load.

The suspension system includes a rigid compression strut 18 which extends generally horizontally between a pair of spaced primary support points 20 and 22 each support point 20,22, as shown at FIG. 4, including a steel plate 21 attached at the top of mast 34 and to which the several components of the suspension assembly are connected by way of suitable connecting pins. The compression strut shown is of a steel lattice construction and, since it is required to bear only compressive loadings, save for the relatively minor bending loads induced by its own weight, the structure can be of relatively lightweight and thus relatively inexpensive construction. For low voltage, low weight applications, the strut 18 can comprise a simple steel pipe strut.

A flexible tension member 24 is suspended below the compression strut 18 and has its opposing ends connected at the primary support points 20 and 22. The flexible tension member 24 typically comprises a high strength wire rope or bridge strand provided at its opposing ends with suitable fittings or cable ends 25 to provide a secure attachment at the primary support points 20 and 22.

An array of insulators, broadly designated by reference 26, is disposed below the flexible tension member 24 and is arranged to support the above-noted electrical conductors 12, 14 and 16 in the desired inverted Delta pattern relative to one another. The insulator array 26 includes opposing end insulators 28 connected to the primary support points 20 and 22 together with intermediate insulators 30 connected to and supported from the flexible tension member 24. The arrangement is such that the total loading imposed on the insulator array 26 by the three conductors 12, 14 and 16 is shared or distributed between the opposing end insulators 28 and the intermediate insulators 30 with the result being that the flexible tension member 24 bears a substantial portion of the total loading. The horizontal components of this total loading on the flexible tension member 24 are, of course, transmitted directly to the compression strut 18, thus setting up a compressive loading in it.

The primary support points 20 and 22 are disposed at the upper ends of a spaced pair of masts 34. Masts 34 may be of any suitable conventional construction and, as shown, they are arranged in the form of a V with the lower ends of the masts 34 supported on a common footing. A pair of guy wires 36 connected to the upper end of each mast 34 at the primary support points 20 and 22 provide the masts and the suspension system with the desired degree of lateral stability. It will be appreciated that the supporting mast configuration may be different from that illustrated and that, in certain instances, the supporting mast structure may be replaced with an altogether different form of structure depending upon environmental factors and the like in the region in which the transmission line is being installed.

Figure 6:
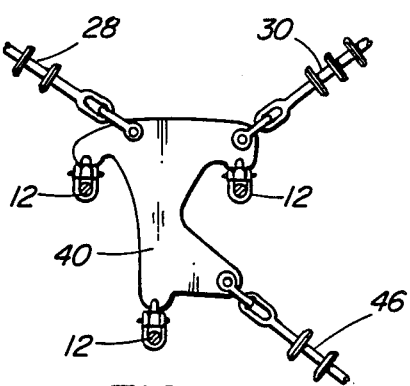
FIG. 6 illustrates a typical conductor support assembly.

Further reference will now be had to the insulator array 26 illustrated in FIG. 1. The insulator array includes first, second and third elements 40, 42 and 44 for supporting the electrical conductors 12, 14 and 16 in the previously referred to inverted Delta or triangle-shaped array. These particular elements 40, 42 and 44 by means of which the electrical conductors are actually secured to the insulator array may be of any well known conventional construction, as illustrated in FIG. 6, further details of which need not be set forth here.

With continued reference to FIG. 1, the previously described opposing end insulator means comprise first and second elongated insulators 28 extending upwardly and outwardly from the first and second support elements 40 and 42 respectively, each to an associated one of the primary support points 20 and 22. The intermediate insulator means comprises a pair of elongated insulators 30 each extending from a respective one of the first and second support elements 40 and 42 upwardly and being connected to the flexible tension member 24 via suitable cable hanger connection devices 43 which are well known per se in the art and which are clamped very tightly on the tension member 24 by U-bolt clamps 45 tightly enough to develop the necessary slip resistance. My co-pending U.S. application Ser. No. 421,836, filed concurrently herewith and entitled "Cable Suspension System" shows a connector system employing sleeve means compressed on the cable which is capable of withstanding high slip loadings. This connector system may be used to advantage in place of the hanger devices 43. The disclosure of the above application is incorporated herein by reference. The intermediate insulators 30 converge toward each other in the upward direction as shown so that they are capable of transmitting to the flexible tension member 24 certain horizontal components of the load thereby to maintain the configuration as shown.

The insulator array 26 includes a further pair of elongated insulators 46 extending downwardly from respective points of attachment adjacent the first and second support elements 40 and 42 to a common point of attachment immediately adjacent the third support element 44.

In any particular configuration, the amount or degree of sag of the flexible suspension member 24 will be preselected in order to limit the tension forces in the insulators to the required degree as well as limiting the amount of compressive force applied to the compression strut 18.

Figure 2:
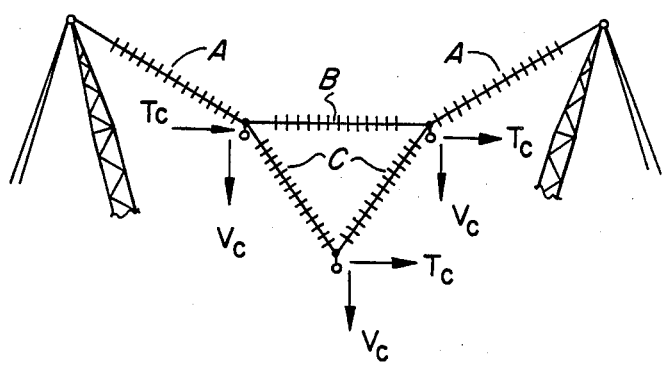
FIG. 2 is a diagrammatic view of a suspended inverted Delta suspension system of the prior art illustrating forces acting thereon when in use.
Figure 3:
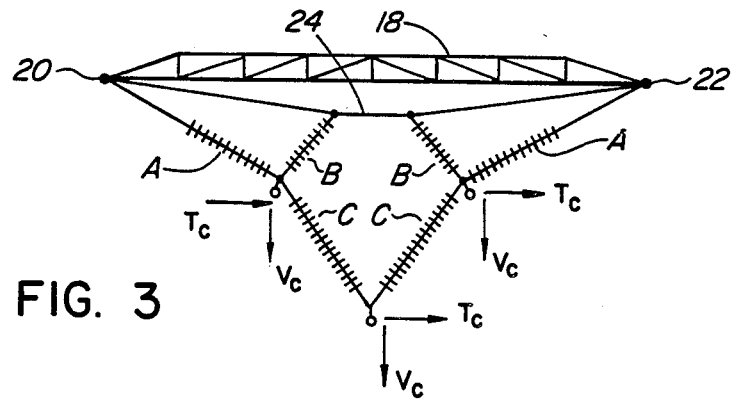
FIG. 3 is a diagrammatic view of a typical suspension system in accordance with the invention illustrating the forces acting thereon when in use.

To further illustrate the advantages associated with the present invention, reference will now be had to FIGS. 2 and 3. FIG. 2 illustrates a typical prior art suspended inverted Delta arrangement. FIG. 3 illustrates a support arrangement in accordance with the present invention. For purposes of convenience in comparing the loadings in the insulators of the two systems, the various insulators have been designated by references A, B and C.

EXAMPLES

A. Consider a 500 KV Transmission Line in an Ice Free Area - e.g. Brazil

Typical 450 m conductor span
Loads given in metric tons (1000 kgs-2200 lbs.)

| Load Case | | | |
|---|---|---|---|
| I: | High Wind | $V_c = 3.5^t$ | At each of 3 phase support points |
| | | $T_c = 5.0^t$ | |
| II: | Construction, | $V_c = 7.5^t$ | At 1, 2 or 3 |
| | Maintenance & Failure Containment | $T_c = 0^t$ | support points |

(Omitting longitudinal loads for simplicity
Suspended ▽ - (Prior Art - See FIG. 2)

| | Insulator Loads | | |
|---|---|---|---|
| | A | B | C |
| Load I: | $18.3^t$ | $6.1^t$ | $6.1^t$ |
| Load II: | $21.6^t$ | $15.3^t$ | $4.8^t$ |

For insulators used at 0.7 of capacity (a liberal value)
Insulator Selection: $2 \times 16.3^t$  $2 \times 11.4^t$  $1 \times 11.4^t$
Insulators of $16.3^t$ or $36^k$ cost $25 US (International bid, Feb./82)
Insulators of $11.4^t$ or $25^k$ cost $15 US (International bid, Feb./82)

Cost of Suspension Assembly

| A — | 2 assemblies × 2 strings × 25 units @ $25 | = | $2500 |
|---|---|---|---|
| | 4 yokes, etc. to couple double strings @ $80 | = | 320 |
| B — | Double string of 43 units (phase to phase insulation) 86 × $15 | = | 1290 |
| | 2 yokes, etc. @ $80 | = | 160 |
| C — | 2 single strings of 43 @ $15 | = | 1290 |
| | | | $5560 |

Suspended ▽ With Compression Strut and Flexible Tension Member - FIG. 3

| | Insulator Loads | | |
|---|---|---|---|
| | A | B | C |
| Load I: | $12.2^t$ | $6.1^t$ | $6.1^t$ |
| Load II: | $11.4^t$ | $8.0^t$ | $4.8^t$ |
| Insulator Selection: | $1 \times 16.3^t$ | $1 \times 11.4^t$ | $1 \times 11.4^t$ |

| Cost: | A — 2 strings of 25 @ $25 | = | $1250 |
|---|---|---|---|
| | B — 2 strings of 25 @ $15 | = | 750 |
| | C — 2 single strings of 43 @ $15 | = | 1290 |
| | | | $3290 |

Saving (to pay for Cross Rope and Compression Strut Capacity):
$5560 − 3290 = $2270

B. Consider a 500 KV line in an Ice Zone

| Load Case | I: | as before |
|---|---|---|
| | II: | as before |
| | III: | $\frac{3}{4}''$ radial ice $V_c$ $10.5^t$ |

Suspended ▽ - (Prior Art - See FIG. 2)

| | Insulators | | |
|---|---|---|---|
| | A | B | C |
| Load III: | $30.2^t$ | $21.4^t$ | $6.7^t$ |
| Insulator Selection: | $3 \times 16.3^t$ | $2 \times 16.3^t$ | $1 \times 11.4^t$ |

Cost of Suspension Assembly:

| A — | 3 × $25 × 2 × $15 | = | $3750 |
|---|---|---|---|
| | 4 yokes × $120 | = | 480 |
| B — | 2 × 43 × $25 | = | 2150 |
| | 2 yokes × $80 | = | 160 |
| C — | 2 × 43 × $15 | = | 1290 |
| | | | $7830 (U.S.) |

Suspended ▽ With Compression Strut and Flexible Tension Member - FIG. 3

| | Insulators | | |
|---|---|---|---|
| | A | B | C |
| Load III: | $16.0^t$ | $11.2^t$ | $6.7^t$ |
| Insulator Selection: | $2 \times 11.4^t$ | $1 \times 16.3^t$ | $1 \times 11.4^t$ |

Cost of Suspension Assembly:

| A — | 2 × 25 × 2 × $15 | = | $1500 |
|---|---|---|---|
| | 4 yokes × $80 | = | 320 |
| B — | 2 × 25 × $25 | = | 1250 |
| C — | 2 × 43 × $15 | = | 1290 |
| | | | $4360 |

Saving: $7830 − 4360 = $3470

It can readily be seen from the above that the arrangement of FIG. 3 in accordance with the present invention possesses a substantial number of advantages over the prior art suspended Delta arrangement shown in FIG. 2. Some of these advantages are:

(1) The loadings in insulators A are substantially reduced under both transverse and vertical loadings. As a result, the insulator and hardware costs are very substantially reduced when utilizing the arrangement according to the present invention.

(2) The relatively high strength horizontal insulator B in the FIG. 2 prior art arrangement can be eliminated altogether while the C insulators of the embodiment according to the invention may be relatively low strength low cost units.

(3) The integrity of the overall suspension assembly of the present invention does not depend on a single insulator assembly as in the prior art arrangement of FIG. 2.

(4) The composite beam structure provided for the present invention can make use of a simple latticed strut acting as the compression member with only negligible bending moments resulting from its own weight. The strut can be made relatively light and for a very reasonable cost. At the same time the tension element, typically of a stranded wire rope, is also one of the very most efficient structural elements and can be provided at relatively low cost. The degree of sag of the tension element can easily be set in order to provide the desired force distribution in the various insulator elements. It will thus be seen that the composite beam effect provided by the present invention makes it possible to carry large vertical and/or longitudinal conductor loads near the mid-point of the assembly without inducing bending, the latter being one of the most costly of loading situations. At the same time the system described, by virtue of the compression strut, keeps the heavy conductor loads from adding to the loadings in the guy wire system.

A preferred embodiment of the invention has been described by way of example. Those skilled in the art will appreciate that numerous changes and modifications to the structure described may be made while still remaining within the scope of the invention as defined in the claims appended hereto.

I claim:

1. A suspension system for supporting a plurality of high voltage electrical conductors forming part of a transmission line in a predetermined spaced pattern relative to one another, comprising:
   (a) means defining a pair of spaced primary support points;
   (b) a rigid compression strut arranged to extend laterally between said pair of spaced primary support points;
   (c) a tension member suspended below said compression strut and having its opposing ends operatively connected at said primary support points so as to apply compression forces lengthwise of the strut when the tension member is loaded;
   (d) an array of insulators disposed below said tension member for supporting the plurality of electrical conductors in the predetermined spaced pattern relative to one another, said insulator array including opposing end insulator means connected at said primary support points and intermediate insulator means connected to said tension member;
   (e) said insulator array including first, second and third elements for supporting the electrical conductors at first, second and third points in an inverted Delta or triangle array;
   (f) said first and second support elements being in horizontally spaced relation;
   (g) the opposing end insulator means comprising first and second elongate insulators extending from said first and second support elements respectively, each to an associated one of said primary support points;
   (h) the intermediate insulator means comprising a pair of elongated insulators each extending from a respective one of said first and second support elements upwardly and being connected to said tension member; so that the total loading imposed on said insulator array by the conductors is shared between said opposing end insulator means and said intermediate insulator means with the tension member thus bearing a portion of said total loading.

2. The suspension system of claim 1 wherein said tension member comprises a cable.

3. The suspension system of claim 2 wherein said cable is connected only at said primary support points, the latter being located at the opposing ends of said strut so that the strut, in use, is substantially only under compressive forces arising from the loadings applied thereto by said cable.

4. The suspension system of claims 1, 2 or 3 wherein said pair of insulators converge toward each other in the upward direction so that they are capable of transmitting horizontal loading components applied at said first and second support elements via said first and second insulators to said tension member.

5. The suspension system of claim 4 including a further pair of elongated insulators extending downwardly from respective points of attachment at said first and second points to a common point of attachment at said third support element.

6. The suspension system of claims 1, 2 or 3 further comprising a pair of generally upright masts upper ends of which define said primary support points, said masts supporting said strut in a generally horizontally disposed position above the ground, each said mast having its upper end connected to said strut at an associated one of said primary support points, and guy wires connected between said primary support points and the ground.

7. A suspension system for supporting a plurality of high voltage electrical conductors forming part of a transmission line in a predetermined spaced pattern relative to one another, comprising:
   (a) means defining a pair of spaced primary support points;
   (b) a rigid compression strut arranged to extend laterally between said pair of spaced primary support points;
   (c) a flexible tension member suspended below said compression strut, which flexible member has its opposing ends operatively connected at said primary support points so as to apply compression forces lengthwise of the strut when the tension member is loaded;
   (d) an array of insulators disposed below said tension member for supporting the plurality of electrical conductors in the predetermined spaced pattern relative to one another, said insulator array including opposing end insulator means and intermediate insulator means;
   (e) first, second and third elements for supporting the electrical conductors at first, second and third points in an inverted Delta or triangle array;
   (f) said first and second support elements being in horizontally spaced relation;
   (g) the opposing end insulator means comprising first and second elongate insulators connected to and extending upwardly and outwardly from said first and second support elements respectively, and each such elongate insulator being connected to transmit loadings thereon to an associated one of said primary support points;

(h) the intermediate insulator means comprising a pair of elongated insulators each connected to and extending from a respective one of said first and second support elements upwardly and being connected to said tension member so that the total loading imposed on said insulator array by the conductors is shared between said opposing end insulator means and said intermediate insulator means.

8. The suspension system of claim 7 including a further pair of load bearing elongated insulators extending downwardly from respective points of attachment at said first and second points to a common point of attachment at said third support element.

* * * * *